(12) United States Patent
Hubner et al.

(10) Patent No.: US 9,911,992 B2
(45) Date of Patent: Mar. 6, 2018

(54) SELF-WETTING MEMBRANE ELECTRODE UNIT AND FUEL CELL HAVING SUCH A UNIT

(71) Applicant: Volkswagen AG, Wolfsburg (DE)

(72) Inventors: Gerold Hubner, Braunschweig (DE); Hannes Scholz, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/888,361

(22) PCT Filed: Mar. 17, 2014

(86) PCT No.: PCT/EP2014/055253
§ 371 (c)(1),
(2) Date: Oct. 30, 2015

(87) PCT Pub. No.: WO2014/177318
PCT Pub. Date: Nov. 6, 2014

(65) Prior Publication Data
US 2016/0064755 A1     Mar. 3, 2016

(30) Foreign Application Priority Data

Apr. 30, 2013   (DE) .................. 10 2013 207 900

(51) Int. Cl.
*H01M 8/04*   (2016.01)
*H01M 8/10*   (2016.01)
(Continued)

(52) U.S. Cl.
CPC ....... *H01M 8/04291* (2013.01); *H01M 4/861* (2013.01); *H01M 4/8636* (2013.01);
(Continued)

(58) Field of Classification Search
CPC ............. H01M 8/1004; H01M 8/1016; H01M 8/1053; H01M 4/861; H01M 4/8657;
(Continued)

(56) References Cited

U.S. PATENT DOCUMENTS 5,998,058 A    12/1999  Fredley
6,017,650 A *  1/2000  Ramunni ............. H01M 4/926
                                                      204/294

(Continued)

FOREIGN PATENT DOCUMENTS

DE        69933301       9/2007
DE      102007025207    12/2008

(Continued)

OTHER PUBLICATIONS

Japanese Office Action for Japanese Application No. 2016-510970 dated Oct. 12, 2017—English translation.

*Primary Examiner* — Muhammad S Siddiquee
(74) *Attorney, Agent, or Firm* — Muncy, Geissler, Olds & Lowe, P.C.

(57) ABSTRACT

A membrane electrode assembly and fuel cell having such assembly. The membrane electrode assembly has a polymer electrolyte membrane, two catalytic electrodes in contact with the polymer electrolyte membrane on both sides, namely an anode and a cathode, and two gas diffusion layers directly or indirectly adjoining the electrodes, namely an anode-side gas diffusion layer and a cathode-side gas diffusion layer. At least one of the gas diffusion layers may optionally feature a microporous layer facing the polymer electrolyte membrane. The sequence of layers is anode-side gas diffusion layer, anode-side microporous layer, anode, polymer electrolyte membrane, cathode, cathode-side microporous layer, cathode-side gas diffusion layer. A relative hydrophobicity of at least two of these components and/or a hydrophobicity gradient within at least one of these (Continued)

Figure 1:
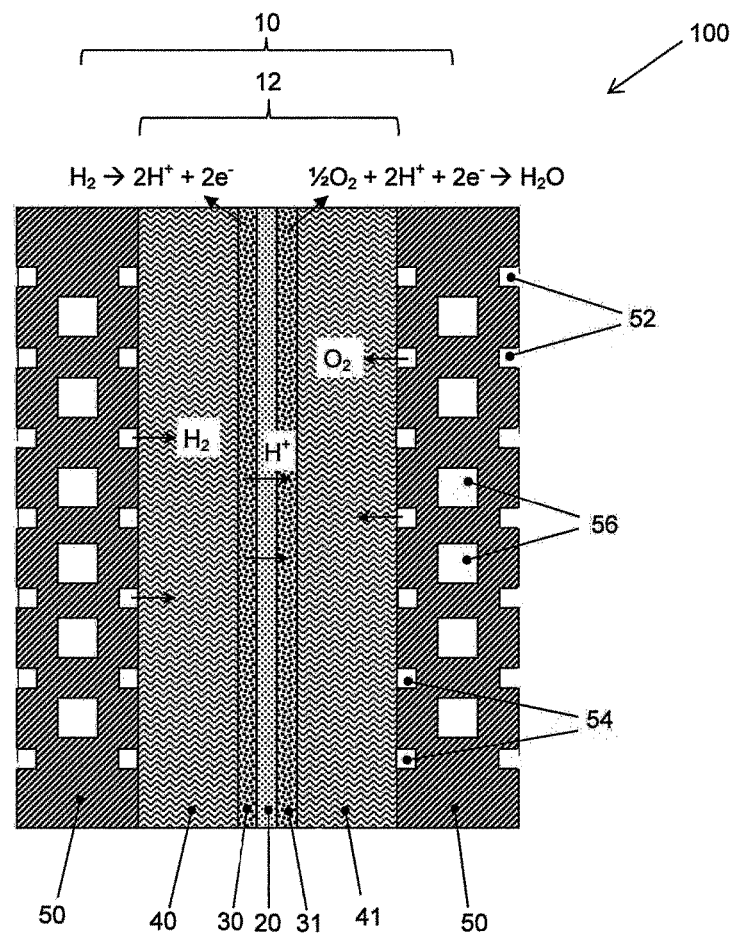

components, and a relative pore structure having pore size and/or porosity of at least two of these components and/or a gradient within the pore structure of at least one of these components, is designed in such a way that it promotes the transport of water via the polymer electrolyte membrane, preferably from the cathode side to the anode side.

10 Claims, 3 Drawing Sheets

(51) Int. Cl.
    *H01M 8/04291*    (2016.01)
    *H01M 8/1004*    (2016.01)
    *H01M 8/1016*    (2016.01)
    *H01M 8/1053*    (2016.01)
    *H01M 4/86*    (2006.01)
    *H01M 8/0241*    (2016.01)
    *H01M 8/1067*    (2016.01)
    *H01M 8/1018*    (2016.01)

(52) U.S. Cl.
    CPC ....... *H01M 4/8657* (2013.01); *H01M 8/0241* (2013.01); *H01M 8/1004* (2013.01); *H01M 8/1016* (2013.01); *H01M 8/1053* (2013.01); *H01M 8/1067* (2013.01); *H01M 2008/1095* (2013.01); *H01M 2300/0082* (2013.01); *H01M 2300/0094* (2013.01)

(58) Field of Classification Search
    CPC ........... H01M 8/0241; H01M 8/04291; H01M 4/8636; H01M 8/1067; H01M 2300/0094; H01M 2008/1095; H01M 2300/0082
See application file for complete search history.

(56) References Cited

U.S. PATENT DOCUMENTS

| | | | |
|---|---|---|---|
| 7,704,629 | B2 | 4/2010 | Lu et al. |
| 8,003,276 | B2 | 8/2011 | Aotani |
| 2004/0209154 | A1 | 10/2004 | Ren et al. |
| 2005/0106450 | A1 | 5/2005 | Castro et al. |
| 2008/0176112 | A1* | 7/2008 | Lu ...................... H01M 4/8605 429/430 |
| 2010/0028736 | A1 | 2/2010 | Unlu et al. |
| 2012/0141910 | A1* | 6/2012 | Jia ...................... H01M 8/0293 429/482 |
| 2012/0202135 | A1 | 8/2012 | Choudhury et al. |
| 2014/0127606 | A1* | 5/2014 | Kuwata ............... H01M 8/1002 429/480 |

FOREIGN PATENT DOCUMENTS

| | | |
|---|---|---|
| DE | 102007014046 | 7/2011 |
| JP | 2006-523936 A | 10/2006 |
| JP | 2007-200855 A | 8/2007 |
| JP | 2010-517219 A | 5/2010 |
| WO | WO 2005069839 | 8/2005 |
| WO | WO 2008116604 | 10/2008 |
| WO | WO 2013004365 | 1/2013 |

* cited by examiner

SELF-WETTING MEMBRANE ELECTRODE UNIT AND FUEL CELL HAVING SUCH A UNIT

The invention pertains to a membrane electrode assembly for a fuel cell with improved water balance as well as to a fuel cell comprising such a membrane electrode assembly.

Fuel cells utilize the chemical conversion of a fuel such as hydrogen with an oxidant such as, for instance, oxygen to generate electrical energy. The core component of fuel cells is a so-called membrane electrode assembly (MEA) that includes an ion-conducting polymer electrolyte membrane, which is in contact with two catalytic electrodes, an anode and a cathode, in a sandwich-like manner. The electrodes are typically connected to gas diffusion layers (GDL), which ensure an even supply of operating gases at the electrodes. Fuel cells are generally formed by a multitude of stacked membrane electrode assemblies with additive electrical output. The MEAs are stacked alternatingly with bipolar panels, which assist with the supply of operating gases as well as cooling or heat dissipation. In an operating fuel cell, the fuel, particularly hydrogen $H_2$ is routed to the anode, where an electrochemical oxidation of $H_2$ to protons $H^+$ takes place while electrons are released. A water-bound or waterless proton transport takes place from the anode space to the cathode space via the membrane, which separates and electrically insulates the gas-tight reaction spaces. The electrons released at the anode are channeled to the cathode via an electric wire. Furthermore, the cathode receives oxygen or an oxygen-containing gas mix such as air, which lead to a reduction from $O_2$ to $O_2^-$ with absorption of electrons. At the same time, these oxygen anions react in the cathode space with the protons transported via the membrane and generate water.

A widely used fuel cell technology is based on polymer electrolyte membranes (PEM), in which the membrane itself consists of a polyelectrolyte. Commonly used membranes consist of sulfonated polytetrafluoroethylene copolymers, for example a product known under the trade name Nafion®, which is a copolymer of tetrafluoroethylene and a sulfonic acid fluoride derivative of a perfluoroalkyl vinyl ether. Since the electrolytic conduction of such membranes takes place by way of hydrated protons, the presence of liquid water is a prerequisite for proton conductivity. For this reason, the operating gases, and especially the anode fuel, have to be humidified for operating such a fuel cell. The operating gases of fuel cells are frequently kept moist with an external humidifier at the front end of the fuel cell, which significantly expands the system expenditure. In the known art, the water is returned via porous bipolar plates (UTC), via peripheral channels in the fuel cell stack, or via grooves in seals inserted between the individual MEAs. However, such solutions only lead to local water exchange and/or decrease the active surface of the membrane electrode assembly and therefore take up additional space. In part, the additional exchange areas lead to inhomogeneous membrane humidification, which results in mechanical stresses that can cause damage to the sensitive membrane. Moreover, the mechanical support layer located outside of the active area can delaminate. In addition to the humidification of the membrane, it must be assured that the reaction water generated at the cathode is consistently drained away to prevent plugging of the porous electrodes and gas diffusion layers.

DE 10 2007 014 046 B4 describes an MEA, in which at least one of the two catalyst layers in contact with the membrane shows spaces along the main area in which the catalyst coating is thinned or even absent. Because of the reduced or absent catalytic conversion, the membrane prevents the osmotic water transport in these places. As a result, only the diffusion-related water transport in the opposite direction takes place, with the intent to create a microcirculation of water within the membrane.

DE 10 2007 025 207 A1 describes a gas diffusion electrode for a fuel cell with an HT polymer electrolyte membrane based on electrolyte-impregnated membranes. It is proposed for the porous catalyst layer arranged on top of the gas diffusion layer to contain hydrophobic material such as graphite or halogenated polyolefins (e.g. PTFE), wherein the concentration of hydrophobic material and accordingly, the hydrophobicity, can increase in the direction of the GDL. In this manner, the drainage of the product water, which is liquid in the presence of low temperatures, to the outside through the GDL is to be accelerated before the water is able to wash the electrolytes out of the membrane or the catalyst layer. In addition to the catalyst layer, the GDL and/or a micro-porous layer (MPL) located between the GDL and the catalyst layer may be coated with hydrophobic material as well.

DE 699 33 301 T2 describes an external humidifier for a fuel cell, wherein this humidifier features a polymer electrolyte membrane, e.g. a Nafion® membrane, which is in contact with a layer of porous, hydrophobic material, e.g. PTFE, on both sides. The membrane serves to transport water from a moist cathode exhaust gas of the fuel cell to a dry air flow moving toward the cathode.

U.S. Pat. No. 5,998,058 describes a gas diffusion layer for a fuel cell featuring pores with a hydrophobic coating and pores with a hydrophilic coating. The hydrophobic and hydrophilic pores are statistically distributed over the entire GDL substrate.

To improve the water balance of fuel cells, DE 103 40 834 A1 proposes the inclusion of a catalyst-free, porous condensation layer of a hydrophilic material between the polymer electrolyte membrane and the catalyst layers, respectively. The condensation layer features a smaller pore size and lower hydrophilic properties than the catalyst layer. The condensation layer is intended to promote the condensation of product water to support membrane humidification.

WO 2005/069839 A2 teaches a fuel cell in which the anode-side and cathode-side gas diffusion layers each feature a hydrophilic substrate. An additional hydrophobic layer is arranged between the cathode-side gas diffusion layer and the cathode electrode.

The present invention proposes a self-humidifying membrane electrode assembly, in which the external humidification for reaction gases is reduced or even completely superfluous.

This problem is solved by the membrane electrode assembly and a fuel cell having the characteristics of the independent claims.

The membrane electrode assembly disclosed by the invention comprises a polymer electrolyte membrane, two catalytic electrodes being in contact with the polymer electrolyte membrane on both sides, namely an anode and a cathode, as well as two gas diffusion layers (GDL) directly or indirectly connected to the electrodes, namely an anode-side gas diffusion layer and a cathode-side gas diffusion layer. Optionally, one or both GDLs may comprise a microporous layer (MPL) facing the polymer electrolyte membrane. According to the invention, within the sequence of layers comprising an anode-side gas diffusion layer/ anode-side microporous layer/anode/polymer electrolyte membrane/cathode/cathode-side microporous layer/cathode-side gas diffusion layer:

a relative hydrophobicity of at least two of these components and/or a hydrophobicity gradient within at least one of these components and/or a relative pore structure, comprising porosity and/or pore size, of at least two of these components and/or a gradient within the pore structure of at least one of these components is designed to promote the transport of water via the polymer electrolyte membrane.

As an embodiment of the invention, the suitable choice of hydrophobicity and/or pore structure in one or more MEA components enables the passive transport of water via the polymer electrolyte membrane and accordingly, its automatic humidification. This results in the water return within the active surface of the MEA. Accordingly, there is no need for additional space to enable water exchange, which allows for a more compact design of the MEA and accordingly, the fuel cell stack. Furthermore, the exchange of water within the active membrane area reduces the risk of mechanical stresses within the sensitive polymer electrolyte membrane due to inhomogeneous humidification. The invention also reduces the risk of delamination of a mechanical support layer located outside of the active area, since the water exchange takes place outside of the laminated protective layer. This results in a greater life expectancy of the MEA.

As a preferred embodiment of the invention, the hydrophobicity and/or pore structure within the above-referenced layer sequence is designed in such a way that it promotes the transport of water via the polymer electrolyte membrane from the cathode side to the anode side. Since water is primarily generated on the cathode side due to the fuel cell reaction, this embodiment also results in the drainage of the product water from the cathode and prevents any unwanted flooding on this side. At the same time, the reverse water transport from the anode to the cathode side already leads to a certain level of membrane humidification.

Within the scope of the invention, "hydrophobicity" is defined as the ability of a material to repel polar substances, particularly water, meaning a tendency to minimize the contact surface between a surface of the hydrophobic material and water. Hydrophobicity increases with decreasing material polarity. The "hydrophobicity" of a material is quantified by the contact angle of a water drop on a planar surface of the material, wherein materials with a contact angle of at least 90° are referred to as hydrophobic. The contact angle is the angle formed by a water drop on the surface of the material, wherein the contact angle is measured between a straight line that is tangential to the drop margin and the contact surface. The less hydrophobic (i.e. the more hydrophilic and polar) the material, the smaller the contact angle, which increases with rising material hydrophobicity. It is understood that a designation such as "Element A is more hydrophobic than Element B" is to be only interpreted as a relative statement. It does not mean that Element A is hydrophobic in the sense that it has a contact angle of 90°. It is further understood that the property of hydrophilicity can be defined analog to the definition of hydrophobicity, in the opposite sense.

This patent defines "porosity" as the measure of hollow cavities per volume or measuring unit. "Pore size" in contrast refers to mean pore size or mean pore diameter.

Preferably, the relative hydrophobicity, meaning a proportion of hydrophobicity between two or more MEA components and/or the hydrophobicity gradient within at least one the components, meaning a proportion of hydrophobicity between different layer depths of this component, is designed in such a way that the hydrophobicity increases in the direction of the cathode-side gas diffusion layer. An equivalent definition applies to hydrophilicity, which as an embodiment of the invention increases in the direction of the anode-side gas diffusion layer. Accordingly, the cathode side is designed to be relatively hydrophobic, while the anode side is comparatively less hydrophobic or comparatively hydrophilic. In this manner, the product water accumulating on the cathode side is displaced and drained, while the anode side absorbs water via the membrane, which automatically humidifies said membrane. If a water transport is to occur in the opposite direction, meaning from the anode to the cathode, the relative hydrophobicity and/or the hydrophobicity gradient has to be selected in the opposite way, i.e. in such a way that the hydrophobicity increases in the direction of the anode-side gas diffusion layer.

As a preferred embodiment, the porosity and/or pore size is selected alternatively or additionally in such a way that it also increases in the direction of the cathode-side gas diffusion layer. The decreasing presence or width of pores in the direction of the anode therefore results in a higher capillary effect, resulting in passive water transport toward the anode. If a water transport is to occur alternatively in the opposite direction from the anode to the cathode, the porosity and/or pore size has to be selected in the opposite way, i.e. in such a way that it increases in the direction of the anode-side gas diffusion layer.

The embodiments of hydrophobicity and pore structure reinforce one another and are therefore particularly advantageous in combination.

In a particularly preferred embodiment of the invention, the hydrophobicity of at least one anode-side component, comprising the anode-side gas diffusion layer, anode-side microporous layer, anode, and one anode side of the polymer electrolyte membrane, is smaller than the hydrophobicity of the corresponding cathode-side component, comprising the cathode-side gas diffusion layer, cathode-side microporous layer, cathode and cathode side of the polymer electrolyte membrane. For example, the anode may feature a lower hydrophobicity than the cathode and/or the anode-side GDL can feature a lower hydrophobicity than the cathode-side GDL etc. This also applies correspondingly to the pore size and/or porosity of the anode-side components and the cathode-side components.

In accordance with a preferred embodiment of the invention, the polymer electrolyte membrane features at least two membrane layers, wherein the hydrophobicity and/or pore size and/or porosity of an anode-side membrane layer is smaller than the hydrophobicity, pore size, or porosity of a cathode-side membrane layer. This promotes the passive transport of water from the membrane's cathode side to its anode side. Optionally, the membrane may feature a porous, preferably centrally arranged, support layer for the purpose of greater stability.

As a preferred embodiment, the different hydrophobicities of the at least two-layered polymer electrolyte membrane are generated by various ionic group concentrations in the polymer electrolyte material of the membrane layers and/or various concentrations of a non-ionic, particularly hydrophobic material that is admixed to the polymer electrolyte material. For example, no or a lower concentration of a hydrophobic material, for instance PTFE, is admixed to the polymer electrolyte material of the anode-side membrane layer than to the cathode-side membrane layer. In this manner, the hydrophobicity of the cathode-side membrane layer is increased relative to the anode-side membrane layer and the concentration of the polymer material's ionic groups on the anode side is higher.

Various porosities of the membrane layers can easily be achieved by adding various concentrations of a chemical or physical blowing agent to the polymeric material during membrane production. The outgassing of this agent then leads to the formation of pores. A higher blowing agent concentration leads to higher porosity. In contrast, pore sizes can be adjusted through the foaming conditions during the membrane layer production, specifically by selecting the pressure gradient and temperature during foaming. It is understood that the pore structure must be selected in such a way in each case that the membrane enables the drainage of water from the cathode to the anode via capillary forces, but is gas-insulating.

Electrodes can also have modified hydrophobicity and/or pore size and/or porosity in accordance with the invention. In one embodiment of the invention, the cathode features higher hydrophobicity and/or pore size and/or porosity than the anode, which promotes the transport of water in the direction of the anode.

In another embodiment of the invention, the cathode comprises at least two layers, wherein the hydrophobicity, pore size and/or porosity of a cathode layer facing the membrane is smaller than those of a layer facing away from the membrane. This promotes the flow of product water from the cathode's GDL side in the direction of the membrane. Similarly, the anode can also comprise two or more layers, wherein the hydrophobicity, pore size and/or porosity of a layer facing the membrane is larger than those of a layer facing away from the membrane. This promotes the transport of water from the membrane side in the direction of the anode-side GDL.

Regardless of the single-layered or multi-layered design of the electrodes, a preferred embodiment of the invention adjusts the hydrophobicity of the anode and/or cathode or of individual layers with the use of a polymer binder with the corresponding hydrophobicity and/or with a variable share of a non-ionic, particularly hydrophobic material, which is admixed to the polymer binder. The electrodes of a fuel cell are typically designed in the form of a catalytic coating, either on the membrane or on the GDL. The catalytic coating features an electrically conductive substrate structure, for example a carbon-based material such as graphite, which is covered with a finely distributed catalytic material, e.g. a precious metal. A polymer binder is typically used to bind such a powder structure. This may be the same polymer material that also makes up the polymer electrolyte membrane. Accordingly, the hydrophobicity of the electrodes can be adjusted in the same manner as previously described in the context of the membrane. As an alternative or in addition to the modification of the polymer binder, it is also feasible to modify the substrate material of the catalytic electrode layers, for example by using modified graphite or alternative materials as a catalyst substrate, or by using catalytic materials of differing hydrophobicity.

In a preferred embodiment of the invention, the gas diffusion layers are modified with regard to their hydrophobicity and/or porosity and/or pore size in accordance with the invention. Similar to the approach discussed in the context of the electrodes, the preferred embodiment comprises greater hydrophobicity, porosity and/or pore size in the cathode-side GDL and/or its microporous layer (MPL) than in the anode-side GDL. As an alternative or in addition to this measure, the hydrophobicity, porosity and/or pore size within the GDL and/or its microporous layer may show a corresponding gradient.

In a preferred embodiment of the invention, the hydrophobicity of the GDLs and/or their MPLs is achieved by coating a substrate of the GDL and/or the microporous layer with a material featuring the corresponding hydrophobicity. As an alternative, the hydrophobicity can be simply adjusted by selecting a hydrophobic substrate for the GDL and/or its microporous layer made from a material with the corresponding hydrophobicity. Furthermore, the hydrophobicity of the MPL can be adjusted by using a polymer binder with the corresponding hydrophobicity.

The invention further pertains to a fuel cell comprising at least one membrane electrode assembly according the invention and particularly a stack with a multitude of such MEAs.

Figure 2:
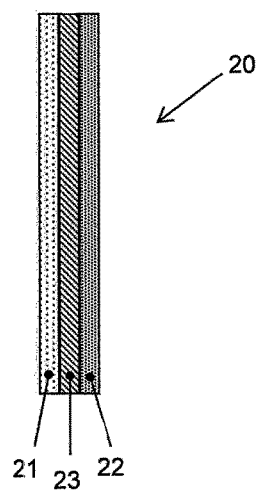
Figure 3:
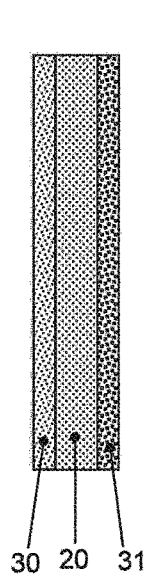
Figure 4:
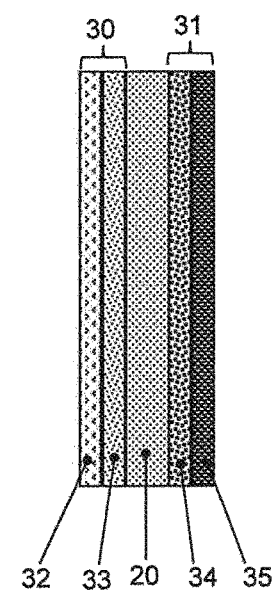
Figure 5:
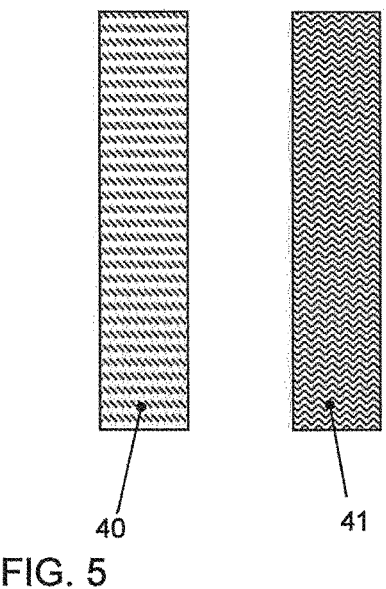
Figure 6:
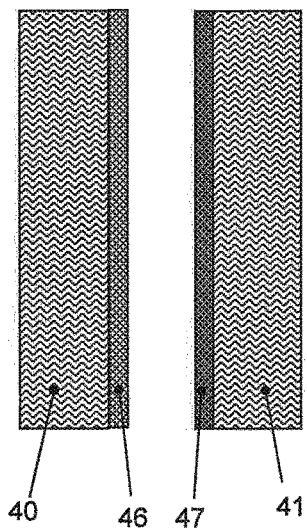
Figure 7:
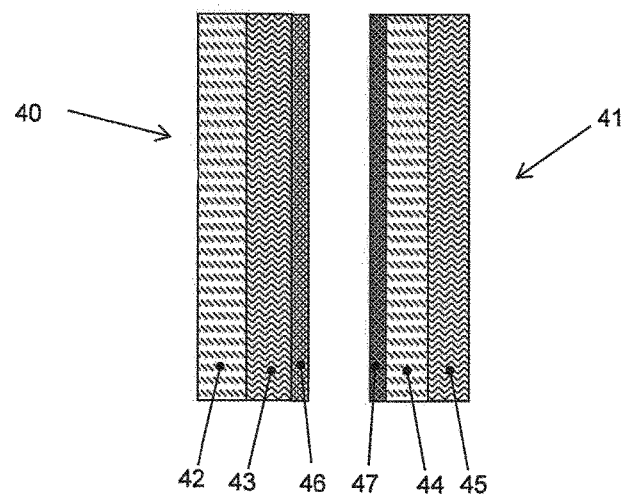
Figure 8:
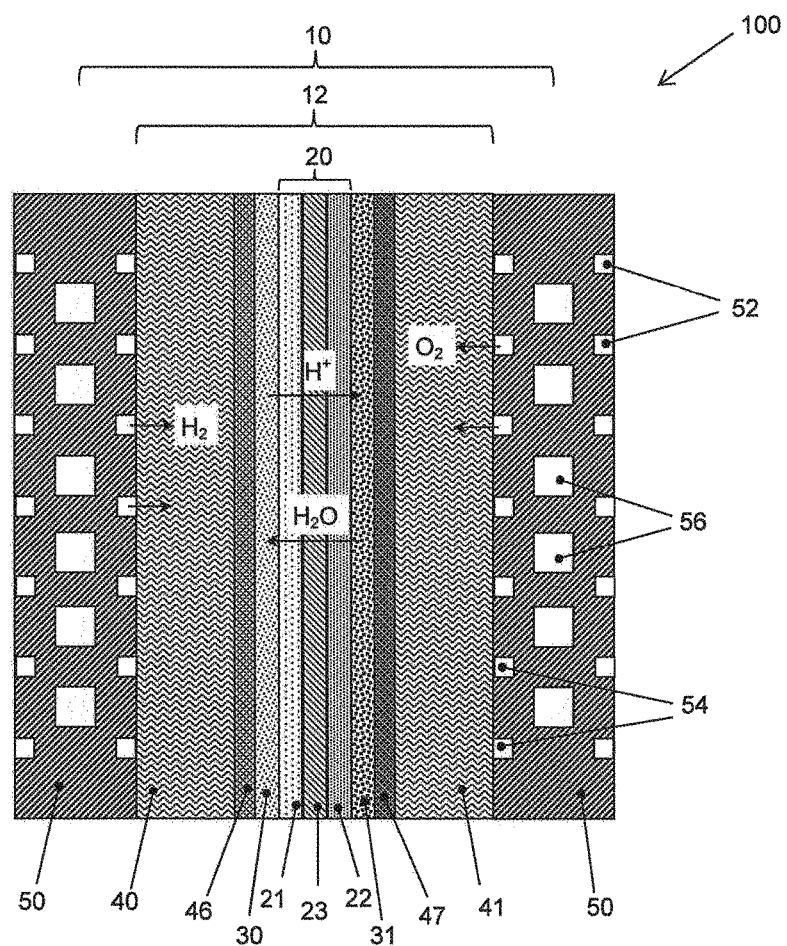

The invention is explained below in exemplary embodiments, using the corresponding drawings. The illustrations show the following:

FIG. 1 Schematic section view of a single cell of a fuel cell according to prior art, FIG. 2 Schematic section view of a polymer electrolyte membrane according to the invention, FIG. 3 Schematic section view of a membrane electrode assembly with electrodes according to the invention in a first embodiment, FIG. 4 Schematic section view of a membrane electrode assembly with electrodes according to the invention in a second embodiment, FIG. 5 Schematic section view of anode-side and cathode-side gas diffusion layers according to the invention in a first embodiment, FIG. 6 Schematic section view of anode-side and cathode-side gas diffusion layers according to the invention in a second embodiment, FIG. 7 Schematic section view of anode-side and cathode-side gas diffusion layers according to the invention in a third embodiment, FIG. 8 Schematic section view of a single cell of a fuel cell according to an embodiment of the invention.

FIG. 1 shows the general structure of a fuel cell designated as 100, of which only a single cell 10 is shown.

Single cell 10 comprises a membrane electrode assembly MEA 12. MEA 12 features a polymer electrolyte membrane 20. This is preferably a membrane made of a polymer material comprising ionic repeat units, meaning it is an ionomer. Its proton conductivity relies on hydrated protons, which means PEM 20 must be humidified. Typically, but not necessarily, this involves the use of a sulfonated polytetrafluoroethylene copolymer, for example the product known under the trade name Nafion®, which is a copolymer of tetrafluoroethylene and a sulfonic acid fluoride derivative of a perfluoroalkyl vinyl ether.

PEM 20 is in contact with two electrodes 30 and 31 on either side, namely an electrode functioning as anode 30 and an electrode functioning as cathode 31. The electrodes 30 and 31 are generally so-called reactive electrodes, which comprise an electrically conductive substrate material coated with a catalytic material. The substrate material typically consists of carbon-based materials, such as graphite. Catalytic materials particularly include precious metals such as platinum or similar. The binding of such powdered composition, for example platinum applied to a graphite substrate, typically relies on polymer binders, which may involve the same material as in PEM 20. The binders achieve a cohesive porous structure of the catalytic layers that constitute electrodes 30 and 31.

The two outer surfaces of anode 30 and cathode 31 are adjoined by a porous gas diffusion layer 40 and 41, respectively. The task of the GDL is to ensure the homogenous distribution of operating gases and their supply to electrodes 30 and 31, as well as to remove unconsumed operating gases and product water. Furthermore, the GDLs are made of an electrically conductive substrate material, typically graphite, which ensures the necessary electrical connection of electrodes 30 and 31. The GPLs 40 and 41 also comprise a microporous layer MPL, which is in contact with the electrodes 30 and 31 (not shown).

The electrodes 30 and 31, in the form of catalyst layers, frequently are present as a coating on GDL 40 and 41 or their MPL. This is referred to as gas diffusion electrodes. Alternatively, the catalytic layers of electrodes 30 and 31 are present as a coating of PEM 20, which is also referred to as a catalyst-coated membrane (CCM). The structure of MEA 12 is enclosed bilaterally by a bipolar plate 50. Each of the bipolar plates 50 features bilaterally open channels 52 and 54, wherein the channels of one side function as anode-side resource channels 52 and the channels of the other side, as cathode-side resource channels 54. In addition, each bipolar plate 50 features enclosed channels 56, which serve as coolant channels to remove heat. The bipolar plates 50 are typically made of an electrically conductive material such as stainless steel.

Typically, a multitude of individual cells 10, each comprising an MEA 12 and a bipolar plate 50 (or two functional halves of two bipolar plates), are arranged in a stack in such a way that the electrical output of the individual cells 10 adds up. One MEA 12 and one bipolar plate 50 alternate in this structure.

In the operation of such a fuel cell 100, the anode-side resource channels 52 of the bipolar plate 50 shown in FIG. 1 on the left are used to channel a fuel, such as for example hydrogen $H_2$, to the anode side of MEA 12. The hydrogen diffuses through the channel structure of the anode-side GDL 40 to reach the catalytic centers of anode 30. Here, the hydrogen reacts to form protons $H^+$ and releases electrons. The protons migrate to cathode 31 via membrane 20, while the electrons are moved to cathode 31 via an exterior circuit. On the cathode side, the cathode-side resource channels 54 are used to channel an oxidant, commonly containing oxygen $O_2$. This is typically air. The oxygen diffuses to cathode 31 via the cathode-side GDL 41, where the oxygen reacts with the provided protons and the electrons channeled via the exterior circuit to form water $H_2O$. Any unused resources and the resulting product water are removed via the corresponding channels 52 or 54 of the bipolar plates 50, wherein unconsumed fuel is typically recirculated.

Since PEM 20 needs water for proton conductivity, its continuous humidification must be guaranteed. As explained above, this occurs in the prior art with an upstream external humidifier, which moistens the operating resources, typically the air channeled to the cathodes. Other humidification measures commonly used in the art focus on the design of specific areas of PEM 20 for water transfer. However, these areas are no longer available for the fuel cell reaction.

In contrast, the present invention proposes designing the hydrophobicity and/or porosity and/or pore size of at least individual components of MEA 12 in such a way that a transport of water occurs via the polymer electrolyte membrane 20, preferably from the cathode side to the anode side. As explained in the exemplary embodiments below, the anode-side GDL 40, anode 30, PEM 20, cathode 31 and/or cathode-side GDL 41 can be modified accordingly. Unless otherwise indicated for the individual components and their function, these can correspond to the properties discussed in the context of FIG. 1. The invention is discussed below on the basis of the preferred embodiment, wherein water is transported from the cathode side to the anode side via polymer electrolyte membrane 20.

FIG. 2 shows a polymer electrolyte membrane 20 according to the preferred embodiment of the present invention. PEM 20 features a multi-layered structure, at least comprising an anode-side membrane layer 21 and a cathode-side membrane layer 22. Optionally, a mechanically stabilizing support layer 23 and/or several anode-side and cathode-side membrane layers may be included between the two membrane layers 21 and 22. For example, support layer 23 consists of a porous polymer structure such as expanded polytetrafluoroethylene (ePTFE).

The two membrane layers 21 and 22 in this embodiment differ by the fact that they feature different hydrophobicity and also different densities of ionic groups (different ion exchange capacity (IEC) or equivalent weight (EW)). In particular, the hydrophobicity of the cathode-side membrane layer 22 is larger than that of the anode-side membrane layer 21. Conversely, the ionic group concentration of the anode-side layer 21 is higher than in the cathode-side layer 22. It is also feasible to have more than two polymer layers with gradients of ion concentration or hydrophobicity. This embodiment of membrane 20 ensures that the product water accumulating on the cathode side is automatically transported to the anode via PEM 20, which guarantees permanent, self-regulatory humidification of membrane 20. The different hydrophobicity levels and ionic group concentrations in layers 21 and 22 are preferably achieved by the use of different polymers that feature various ionic group concentrations.

For example, the PEM 20 shown in FIG. 2 can be generated by creating a solution of a first polymer electrolyte with a comparatively high ionic group concentration in an organic or aqueous solvent. This solution is applied to the support layer 23 positioned on the conveyor belt of a membrane pulling system, for example by using a blade. This construct is then moved to a drying stage via the conveyor belt, where the solvent evaporates and leads to the formation of membrane layer 21. In a subsequent production stage, a solution of another polymer electrolyte, having a higher ionic group concentration and accordingly, lower hydrophobicity, is produced and applied to the other side of support layer 23. After drying, it forms the cathode-side polymer layer 22. If no support layer 23 is used, the individual polymer electrolyte membranes 21 and 22 are directly adjacent, wherein the application of the next layer takes place when the previous layer has dried.

In a further embodiment, membrane layers 21 and 22 differ by the fact that they feature different porosities and/or pore sizes in such a way that the porosity gradient enables the drainage of water from the cathode to the anode via capillary forces. In particular, the anode-side polymer layer features a lower porosity and/or lower mean pore diameter than the cathode-side polymer layer 22. Porosity can be controlled in simple ways by admixing a chemical or physical blowing agent to the polymer solution during the production process. This agent releases a gas during the drying stage that results in pores.

FIG. 3 shows the structure of a polymer electrolyte membrane 20, in contact with an electrode on both sides according to the present invention, namely an anode 30 and a cathode 31. As in the prior art, the electrodes 30 and 31 are made of an electrically conductive substrate such as graphite, which is coated with a catalytic material such as platinum and bonded with a polymer binder. FIG. 3 shows the catalytic layers of electrodes 30 and 31 coated onto PEM 20 (CCM). As an alternative, the catalyst layers can also be applied to the GDL to create a gas diffusion electrode. The two electrodes 30 and 31 differ by the fact that they feature different hydrophobicity and/or pore structure. In particular, cathode 31 features higher hydrophobicity and/or higher porosity and/or pore size than anode 30.

As in the case of PEM 20 shown in FIG. 2, the various hydrophobicity levels of electrodes 30 and 31 can be generated by the use of different polymer binders with the corresponding hydrophobicities. Alternatively, the same polymer binder such as Nafion® can be used in both electrodes, and the various levels of hydrophobicity are adjusted by admixing different volumes of a hydrophobic material such as PTFE. As another alternative, various hydrophobicities can also be created by using different catalyst substrates. For example, graphite that is modified with functional groups of different wetting behavior can be used as a catalyst substrate, e.g. sulfonated graphite on the side of anode 30 and/or fluorinated graphite on the side of cathode 31. Such modified graphites are commercially available (e.g. Cabbot). It is equally feasible to use other materials with the corresponding hydrophobicity or hydrophilicity instead of graphite. These include ceramic-based materials or those based on electrically conductive metal oxides. Such materials may not require further coating or binders, which would further improve their aging properties. In a further alternative, the different wetting behavior of anode 30 and cathode 31 can be generated by using different catalytic materials having various surface energies. For example, platinum can be replaced with alloyed catalysts with the corresponding wetting behavior.

In a specific embodiment, a Nafion® solution was mixed in alcohol (DuPont 2020) with a graphite-substrate Pt catalyst (60% Pt/Ketjen). PTFE was added to the mixture either as a fine powder or as a solution (e.g. in isopropanol by Constable). Different solutions with various degrees of PTFE content were produced. The proportion of PTFE to Nafion® determines the subsequent hydrophobicity of the paste, wherein a higher PTFE content results in higher levels of hydrophobicity. The resulting pastes were thoroughly mixed in an ultrasound bath and applied in sequence to membrane 20, using a blade. The solvent was then evaporated in a drying cabinet, which resulted in the catalyst layers 30 and 31, and accordingly, in a catalyst-coated membrane (CCM) as shown in FIG. 3.

FIG. 4 shows another embodiment of the modified electrodes 30 and 31 on a PEM 20 in accordance with the invention. In this embodiment, the anode 30 comprises two layers 32 and 33, wherein the hydrophobicity and/or pore size and/or porosity of the membrane 20 facing the layer 33 is larger than those of a layer 32 facing away from PEM 20. Similarly, cathode 31 also features two layers 34 and 35, wherein the hydrophobicity, pore size and/or porosity and/or pore size of the membrane 20 facing the layer 34 is smaller than those of a layer 35 facing away from membrane 20. In this manner, a gradient of hydrophobicity is established, which increases from layer 32 over layers 33 and 34 to layer 35. The same applies to the porosities or pore sizes. The gradient of hydrophobicity and porosity generates the flow of water from the side of cathode 31 to the anode 30 via membrane 20. In principle, the same effect can also be achieved if layers 32 and 34 and layers 33 and 35 correspond, meaning that the respective gradient of hydrophobicity and/or porosity only exists within the cathode 30 or the anode 31.

The layer thickness of the catalyst layers 30 and 31 in the embodiments shown in FIGS. 3 and 4 is preferably in the range between 2 to 20 μm.

FIG. 5 shows an anode-side gas diffusion layer 40 as well as a cathode-side GDL according to the present invention.

The two GDLs 40 and 41 differ by the fact that the cathode-side GDL 41 features higher hydrophobicity, greater porosity, and/or a larger pore size than the anode-side GDL 40. Accordingly, the cathode-side GDL 41 has a water-draining effect, and the anode-side GDL 40 has a water-circulating effect.

The different hydrophobicity levels of the two GDLs 40 and 41 can be achieved by different coatings of a GDL substrate with hydrophobic or less hydrophobic (or hydrophilic) polymers. As an alternative, the various hydrophobicities can also be created by using different substrate materials. Similar to the approach discussed in the context of the substrate materials for electrodes 30 and 31, the customary, graphite-based substrate materials of the GDL can again be replaced with alternative materials having the desired hydrophobicity. For example, it is feasible to use materials based on ceramics or based on conductive metal oxides. Both the currently used graphite-based GDL substrates and the alternative substrate materials are commercially available in various porosities.

FIG. 6 shows an alternative embodiment of GDLs according to the invention. In this example, the GDLs 40 and 41 also comprise a microporous layer MPL 46 or 47, which in the assembled state is in contact with the electrode 30 or 31. In this example, the two MPLs 46 and 47 differ by the fact that they feature different hydrophobicity, porosity, and/or pore size. Again, the hydrophobicity and/or porosity and/or pore size of the cathode-side MPL 47 is larger than those of the anode-side MPL 46. This embodiment again gives anode-side GDL 40 a water-retaining effect, and a water-draining effect to the cathode-side GDL. The GDL layers 40 and 41 in FIG. 6 in this example feature matching properties, but can also differ, as shown in FIG. 5, by their hydrophobicity levels, porosities and/or pore sizes.

MPLs 46, 47 are typically produced with a similar process and with similar materials as the catalytic layers of electrodes 30 and 31, but without the use of catalytic material. It typically involves a substrate material, frequently based on graphite, which is suspended in a solvent, followed by the addition of a suitable polymer binder. The resulting paste or suspension is applied to the GDL substrate 40, 41 with a blade, screen printing, or spray process and dried. Accordingly, the use of polymer binders with different hydrophobicity or the admixture of various shares of a hydrophobic material can again achieve different levels of hydrophobicity.

In a specific embodiment, a solution of Nafion® polymer in alcohol (DuPont 2020) was mixed with a graphite powder (e.g. Ketchen[DR1] Black by Ketchen Black International or XC-72 or E-HSAG 400). PTFE powder or a PTFE suspension in isopropanol (by Constable) was added to the mixture. The proportion of PTFE to Nafion® determines the ultimate hydrophobicity of the MPL. After mixing the paste, e.g. in an ultrasound bath, it was applied to the GDL substrate 40 or 41 with a blade process. The solvent was then evaporated in a drying cabinet, which resulted in a deep black, electrically conductive layer. The cathode-side MPL 47 had a higher PTFE content and therefore, had a hydrophobic effect. On the other side, the higher Nafion® content led to a water-retaining effect in the anode-side MPL 46. The layer thickness of the resulting MPLs is typically in the range between 4 to 30 μm.

The desired porosity of MPLs 46 and 47 can be achieved by adding a physical or chemical blowing agent to the paste or suspension in the production process. For example, ammonia carbonate can be used as a chemical pore promoter. It breaks down at elevated temperatures in the drying cabinet and leads to foaming.

FIG. 7 shows another embodiment of the gas diffusion layers 40 and 41, which in this example also have microporous layers 46 and 47. The GDLs 40 and 41 differ from the example shown in FIG. 6 by the fact that the GDL substrate contains layers in each case. In this example, they have two layers 42, 43 and 44, 45, respectively. In this manner, a gradient of hydrophobicity and/or porosity and/or pore size is established within each individual GDL 40, 41, which increases in the selected view from left to right.

It is understood in the context of the invention that the modifications of the individual components according to the invention, comprising the polymer electrolyte membrane 20, the electrodes 30, 31 and the gas diffusion layers 40, 41, can be advantageously combined.

FIG. 8 shows an example of a fuel cell according to the invention featuring a combination of various of the above-discussed measures. In particular, fuel cell 100 comprises a membrane electrode assembly 12, which features a multi-layered polymer electrolyte membrane 20 according to FIG. 2, an anode 30 and cathode 31 according to the invention as shown in FIG. 3, as well as an anode-side GDL 40 and a cathode-side GDL 41 as shown in FIG. 6 with the corresponding MPLs 46, 47. All other functions correspond to those discussed in the context of FIG. 1.

The fuel cell 100 according to the invention ensures the automatic transport of the product water resulting from the operation of fuel cell 100 from the cathode side to the anode side via PEM 20, which permanently and automatically humidifies membrane 20. The self-humidifying MEA 12 creates a considerable simplification of the fuel cell system, because the need for external humidification is eliminated. At the same time, the unit achieves higher operational stability with varying moisture content of the operating gases. Since the water return takes place within the active surface of the membrane electrode assembly 12, the fuel cell stack construction can be more compact. Additional surfaces for water return, which allows for an exchange of moisture outside of the active surface, which have been suggested in alternative concepts of the prior art, are not required in this case. Furthermore, the water balance within the active surface keeps the mechanical stress of the membrane and electrode to a minimum.

REFERENCE LIST

100 Fuel cell
10 Membrane electrode assembly (MEA)
12 Individual cell
20 Polymer electrolyte membrane (PEM)
21 Anode-side membrane layer
22 Cathode-side membrane layer
23 Support layer
30 Anode
31 Cathode
32 First anode layer
33 Second anode layer
34 First cathode layer
35 Second cathode layer
40 Anode-side gas diffusion layer (GDL)
41 Cathode-side gas diffusion layer (GDL)
42 First anode-side GDL
43 Second anode-side GDL
42 First cathode-side GDL
43 Second cathode-side GDL
46 Anode-side microporous layer (MPL)
47 Cathode-side microporous layer (MPL)
50 Bipolar plate
52 Anode-side resource channels
54 Cathode-side resource channels
56 Coolant channels

The invention claimed is:

1. A membrane electrode assembly for a fuel cell comprising:
a polymer electrolyte membrane,
two catalytic electrodes in contact with the polymer electrolyte membrane, the two catalytic electrodes including an anode and a cathode, the anode provided on a first side of the polymer electrolyte membrane and the cathode provided on a second side of the polymer electrolyte membrane, and
two gas diffusion layers directly or indirectly adjoining the electrodes, the two gas diffusion layers including an anode-side gas diffusion layer adjoining the anode and a cathode-side gas diffusion layer adjoining the cathode,
wherein the two gas diffusion layers each include a microporous layer provided on a side of the two gas diffusion layers facing the polymer electrolyte membrane, respectively,
wherein anode-side components include the anode-side gas diffusion layer, an anode-side microporous layer provided on a side of the anode-side gas diffusion layer that faces the polymer electrolyte membrane, the anode and a side of the polymer electrolyte membrane that faces the anode,
wherein cathode-side components include the cathode-side gas diffusion layer, a cathode-side microporous layer provided on a side of the cathode-side gas diffusion layer that faces the polymer electrolyte membrane, the cathode and a side of the polymer electrolyte membrane that faces the cathode,
wherein at least one of hydrophobicity, porosity, and pore size of each of the anode-side components is smaller than at least one of hydrophobicity, porosity, and pore size of the cathode-side components that correspond thereto, so that the transport of water is promoted via the polymer electrolyte membrane.

2. The membrane electrode assembly according to claim 1, wherein at least one of the hydrophobicity and pore structure is configured to promote the transport of water via the polymer electrolyte membrane from the cathode side to the anode side.

3. The membrane electrode assembly according to claim 1 wherein at least one of a relative hydrophobicity and a hydrophobicity gradient is configured so that the hydrophobicity increases in the direction of the cathode-side gas diffusion layer.

4. The membrane electrode assembly according to claim 1, wherein at least one of a relative porosity, the pore size, and a porosity gradient is configured so that at least one of the porosity and pore size increases in the direction of the cathode-side gas diffusion layer.

5. The membrane electrode assembly according to claim 1, wherein the polymer electrolyte membrane features at least two membrane layers including an anode-side membrane layer and a cathode-side membrane layer, wherein at least one of the hydrophobicity, pore size, and porosity of the anode-side membrane layer is smaller than at least one of the hydrophobicity, pore size, and porosity of the cathode-side membrane layer.

6. The membrane electrode assembly according to claim 5, wherein different hydrophobicities of the at least two membrane layers are generated by at least one of various concentrations of ionic groups in a polymer electrolyte material of the at least two membrane layers and various concentrations of a non-ionic, hydrophobic material that is admixed to the polymer electrolyte material.

7. The membrane electrode assembly according to claim 1, wherein the cathode features at least two layers including a layer facing the polymer electrolyte membrane and a layer facing away from the polymer electrolyte membrane, wherein at least one of the hydrophobicity, pore size, and porosity of the layer facing the polymer electrolyte membrane is smaller than the hydrophobicity, pore size, and porosity of the layer facing away from the polymer electrolyte membrane and/or the anode features at least two layers including a layer facing the polymer electrolyte membrane and a layer facing away from the polymer electrolyte membrane, wherein at least one of the hydrophobicity, pore size, and porosity of the layer facing the polymer electrolyte membrane is larger than the hydrophobicity, pore size, and porosity of the layer facing away from the polymer electrolyte membrane.

8. The membrane electrode assembly according to claim 7, wherein the hydrophobicity of at least one of the anode and cathode, or the at least two layers of the anode and the cathode is adjusted with the use of a polymer binder with the corresponding hydrophobicity and/or with a variable share of a non-ionic, hydrophobic material, which is admixed to a polymer binder.

9. The membrane electrode assembly according to claim 1, wherein the hydrophobicity of at least one of the two gas diffusion layers and the respective microporous layer is adjusted by coating at least one of a substrate of the two gas diffusion layers and the respective microporous layer with a material of the corresponding hydrophobicity or by selecting a substrate for at least one of the two gas diffusion layers and the respective microporous layer that is made of a material with the corresponding hydrophobicity.

10. A fuel cell comprising at least one membrane electrode assembly according to claim 1.

* * * * *